United States Patent [19]

Feast et al.

[11] 3,880,786
[45] Apr. 29, 1975

[54] GRAFT COPOLYMER PREPARATION

[75] Inventors: Alan Arthur John Feast, Eastleight; Peter Ingram, Southampton, both of England

[73] Assignee: The International Synthetic Rubber Company Limited, Southampton, England

[22] Filed: Nov. 6, 1972

[21] Appl. No.: 303,814

[30] Foreign Application Priority Data
Nov. 12, 1971 United Kingdom............... 52773/71
Dec. 30, 1971 United Kingdom............... 60641/71

[52] U.S. Cl...... 260/23 EM; 260/876 R; 260/880 R
[51] Int. Cl......................... C08f 19/14; C08f 21/04
[58] Field of Search......... 260/23 EM, 23 R, 876 R, 260/880 R

[56] References Cited
UNITED STATES PATENTS
3,213,159 10/1965 Adonoitis....................... 260/876 R
3,262,993 7/1966 Hagemeyer..................... 260/876 R
3,267,069 8/1966 Cummings...................... 260/876 R
3,270,777 9/1966 Thompson...................... 260/876 R OTHER PUBLICATIONS
"Condensed Chemical Dictionary," 1967, page 777 relied on.

*Primary Examiner*—Donald E. Czaja
*Assistant Examiner*—W. E. Parker
*Attorney, Agent, or Firm*—Cushman, Darby & Cushman

[57] ABSTRACT

The invention relates to a process for preparing graft copolymers such as A.B.S. in which a particular type of emulsifier is admixed with the latex and monomers before graft polymerisation is initiated. The use of this type of emulsifier enables the degree of grafting to be increased leading to enhanced impact strength. The invention is of particular applicability to grafting reactions carried out at elevated temperatures.

13 Claims, No Drawings

GRAFT COPOLYMER PREPARATION

This invention relates to a process for the preparation of graft copolymers.

It is well known in the preparation of graft copolymers to graft a monomer or mixture of monomers onto a rubbery backbone polymer. For example, in the preparation of acrylonitrile-butadiene-styrene copolymers (ABS), acrylonitrile and styrene are frequently grafted onto a latex of a rubbery backbone polymer which is a rubbery polybutadiene and/or a rubbery styrene-butadiene copolymer. Prior to admixing the latex of the rubbery backbone polymer with the monomer(s), it is desirable to adjust the stability of the latex to ensure that little, and preferably no, coagulation of the latex occurs when the grafting reaction takes place, and also to ensure that the grafting reaction occurs with optimum efficiency. Thus, although the latex already contains emulsifier (from the latex preparation step) it is usual to admix additional emulsifier with the latex.

When the grafting reaction is initiated, for example by addition of free radical initiator, competing reactions may occur and there is a general loss of reaction control particularly where elevated temperatures (e.g. greater than 50°C) which are otherwise very desirable, are used. Elevated temperatures for grafting are very desirable since thermoplastic products having improved melt flow properties may be obtained and in addition reaction rates are much faster. The competing reactions are the grafting reaction itself and homopolymerisation and/or copolymerisation of the monomer(s) being grafted. In addition there is also a tendency for the backbone polymer to crosslink and gel. The overall effect is that the degree of grafting is low. The loss of control and accompanying competing reactions are a problem since a lowering of the physical properties of the graft copolymer product occurs. This is particularly so where some or all of the heat evolved in the grafting reaction is retained in the reaction mixture, e.g. where the reaction is performed under substantially adiabatic conditions. It is possible to exercise some control on the reactions which occur by decreasing the amount of emulsifiers added but this decreases the stability of the latex to coagulation which is generally not acceptable.

Normally the emulsifier which is used to adjust the stability of the latex is the same as that used to prepare the latex and is a rosin acid salt or a mono unsaturated fatty acid salt such as potassium oleate which leads to the above mentioned disadvantages in graft polymerisation, especially at elevated temperatures.

According to the present invention, a process for preparing a graft copolymer from a latex of rubbery backbone polymer comprises (a) admixing the latex, one or more vinyl aromatic monomers, one or more unsaturated nitrile monomers, and not more than 15 parts by weight per hundred parts by weight of rubber (phr) of an emulsifier comprising one or more salts of general formula $$CH_3(CH_2)_x (CH_2CH = CH)_n (CH_2)_y COOM$$

wherein $x$ is zero or an integer, $y$ is an integer and $n$ is an integer of value 2 to 4, the sum of $(x + y + n)$ being in the range 10 to 18, and M is an alkali metal; (b) graft polymerising the latex mixture at a temperature of at least 50°C and (c) recovering the graft copolymer.

In a preferred embodiment, the present invention relates to a process for grafting styrene and/or acrylonitrile onto a rubbery backbone polymer which is polybutadiene or a butadiene styrene copolymer.

By including in the graft polymerisation system an emulsifier according to the formula above it is possible to increase the degree of grafting in a simple manner leading to enhanced impact strength in the graft copolymer product.

The emulsifier which is admixed with the latex comprises one or more salts of the general formula $$CH_3 (CH_2)_x (CH_2CH = CH)_n (CH_2)_y COOM$$

wherein $x$ is zero or an integer, $y$ is an integer and $n$ is an integer of 2 to 4, the total of $(x + y + n)$ being in the range 10 to 18 and wherein M is an alkali metal. Preferably M is sodium or potassium. The emulsifier is compatible with the emulsifier(s) already present in the latex and generally has anionic characteristics. Preferably $x$, $y$, and $n$ in the formula above are 3, 7 and 2 respectively, the salt in this case being a linoleate. Preferably the emulsifier comprises potassium linoleate. Another example of a suitable emulsifier is the potassium salt of linolenic acid ($x = o$, $y = 7$, $n = 3$, M = potassium).

In a preferred embodiment of the invention a mixed emulsifier is used in which up to 80% by weight (of the mixed emulsifier) is a salt of the general formula above. Thus a commercial unrefined emulsifier, being a mixture of emulsifiers may be used with a consequent reduction in costs. In this preferred embodiment the balance of emulsifier present in the mixed emulsifier generally comprises an alkali metal salt (usually a potassium or sodium salt) of any other long chain carboxylic acid (e.g. having 12 to 20 or more carbon atoms). Examples of suitable carboxylic acid salts are the salts of unsaturated fatty acids having 14 to 18 carbon atoms such as oleic acid, salts of rosin acid ($C_{20}$) and salts of palmitic acid ($C_{16}$), a particularly preferred salt being potassium oleate. Preferably the amount of potassium linoleate is at least 20% by weight, the balance being potassium oleate and saturated fatty acid salts. The preferred embodiment therefore includes the use of an emulsifier prepared from the fatty acid fraction of natural oils without refining of the fraction into its constituent fatty acids. Suitable natural oils are given below:

| Oil | Fatty acid composition (per cent wt) | | | |
|---|---|---|---|---|
| | Saturated acids | Oleic acid | Linoleic acid | Linolenic acid |
| Tall Oil (S.U.S.A.) | 2 | 50 | 45–50 | 0 |
| Tall Oil (N.Finland) | 3 | 30–40 | 60–70 | Trace |
| Soya bean | 19 | 22 | 50 | 9 |
| Safflower seed | 7 | 26 | 67 | — |
| Sunflower seed | 10 | 22 | 68 | — |
| Poppy seed | 9 | 28 | 63 | — |
| Tobacco seed | 5 | 27 | 66 | 2 |
| Niger seed | 15 | 15 | 66 | 4 |
| Rubber seed | 21 | 20 | 38 | 21 |
| Candle nut* | 13 | 10 | 49 | 28 |
| Linseed | 10 | 20 | 20 | 50 |
| Perilla | 7 | 20 | 5 | 68 |
| Stillingia | 9 | 10 | 30 | 45 |
| Conophor | 11 | 12 | 12 | 65 |

*Variable composition; the linolenic acid content can be as low as ca.10%.
(ref: Modern Surface Coatings P. Nylen/E. Sunderland) Interscience Publishers 1965 p.63 and 102.

The use of such emulsifiers included in this preferred embodiment enables improved properties in the graft copolymer to be obtained with a significant reduction in raw material costs. Tall oil fatty acid salts offer a particularly favourable balance of emulsifiers and are readily available.

Preferably where the linoleic acid content in the fatty acid fraction of natural oils exceeds about 30% by weight, the linolenic acid content is less than 10%, more preferably 0 to 5%. These figures are intended as a guide only since a variety of factors affect the fatty acid composition of natural oils. Further the choice of preferred oil is likely to be affected by availability and price which play an important part in the economics of the graft polymerisation process. From the technical point of view it is preferred to use a salt of the fatty acid fraction of a natural oil in which a major proportion of the fatty acid fraction (e.g. 70% by weight or more) is oleic acid and linoleic acid in the approximate weight ratio of 80:20 to 20:80. Tall oil fatty acid salts are preferred.

Generally, the total amount of emulsifier (other than secondary emulsifier) used is up to 15 phr, usually 6 to 10 phr. Insufficient emulsifier is liable to cause coagulation formation during grafting whilst too much causes overstabilisation. Overstabilisation generally leads to insufficient grafting, the monomers simply copolymerising together. At the optimum emulsifier level, grafting occurs with optimum efficiency and substantially no coagulum is formed. By varying the proportion of emulsifiers present in the mixed emulsifier i.e. by adjustment of the emulsifiers balance, close control may be exercised upon the grafting reaction and thus the reaction may be varied to obtain the desired properties in the final graft copolymer. If more than 60% by weight of salts of the general formula above is present, the reaction rate is generally reduced to an undesirably low level. Preferably a secondary emulsifier such as an alkali metal salt of naphthalene-sulphonic acid derivatives (e.g. the sodium salt of naphthalene-sulphonic acid-formaldehyde condensate) is included prior to grafting usually in amounts of up to 2.0 phr, e.g. 0.8 phr.

The latex of the rubbery backbone polymer may be obtained by a variety of methods, generally by emulsion polymerisation of the monomer(s) constituting the rubbery backbone polymer. The rubbery backbone polymer is generally a rubbery homopolymer of a conjugated diene such as butadiene or isoprene, a copolymer of such dienes, or a copolymer of one or more conjugated dienes with up to 50% by weight (based on total monomers) of one or more vinyl aromatic monomers such as styrene or vinyl toluene, and optionally up to 20% by weight (based on total monomers) of other copolymerisable monomers, especially monomers such as acrylic or methacrylic acid and/or esters and/or nitriles thereof. Preferably the rubbery backbone polymer is polybutadiene or a copolymer of butadiene with up to 30% by weight, usually 5 to 15% by weight, of styrene (SBR). Latex mixtures, e.g. of polybutadiene and of SBR, may be used if desired.

Preferably the latex of the rubbery backbone polymer has particular characteristics. It is particularly preferred that the number average particle size (diameter) of the latex is at least 1500 Angstrom units and desirably is in the range of 2000 to 2700 Angstrom units or more. The weight average particle diameter is preferably at least 2,300 Angstrom unit. Preferably the swelling index of the polymer particles (as defined in U.K. Patent Specification No. 965,851 and measured as defined therein except using toluene instead of benzene and using a 200 mesh screen) does not exceed 30 and is desirably in the range 5 to 15. Polymers having a swelling index of above 30, e.g. 40 to 70, may however be used, but generally the physical properties of the resultant graft copolymer are not so acceptable. The gel content (as determined by precipitation, dissolution in toluene for 24 hours or more at room temperature and filtration through a 200 mesh gauze) is preferably at least 50% and may be as high as 80% to 90% or more. The invention is particularly applicable to polymers of low swelling index and high gel content.

Particularly satisfactory latices are those obtained by emulsion polymerisation using potassium, sodium or lithium oleate and/or potassium or sodium rosin acid salt as emulsifier, especially when used with a secondary emulsifier such as an alkali metal salt of a naphthalene sulphonic acid derivative (e.g the sodium salt of naphthalene-sulphonic acid-formaldehyde condensate). Generally the total amount of emulsifier (including secondary emulsifier) used for the emulsion polymerisation is in the range of e.g. 0.25 to 3.5 parts per hundred parts of monomer (phm), preferably 0.5 to 1.5 phm. The secondary emulsifier may be used in amounts of e.g. 0.2 to 1.0 phm. One method of preparing a suitable rubbery polymer latex is disclosed in Bennett et al U.S. Ser. No. 250,745 filed May 5, 1972 one embodiment of which is a continuous process for preparation of a butadiene polymer latex, and such a rubbery polymer latex is preferred in the process of the present invention.

Examples of vinyl aromatic monomers which may be admixed with the rubber latex in step (a) of the process are styrene, alpha-methyl styrene, methyl styrene and vinyl toluene, styrene being a preferred monomer. Examples of unsaturated nitrile monomers are acrylonitrile and methacrylonitrile. The amounts and types of vinyl aromatic monomer(s) and unsaturated nitrile monomer(s) used may be varied to obtain a wide variety of properties in the final graft copolymer. Thus the graft copolymer may be thermoplastic or rubbery as desired.

Where it is desired that the graft copolymer be thermoplastic, generally the rubber content is in the range 5 to 40% by weight of the total, the vinyl aromatic content is 40 to 80% by weight, and the unsaturated nitrile content 15 to 40% by weight. Usually in such cases the rubber is polybutadiene, the vinyl aromatic monomer is styrene and the unsaturated nitrile monomer is acrylonitrile, the graft copolymer being, therefore, ABS. In the case where it is desired that the graft copolymer be rubbery the grafted monomer contents are much lower. For example, 40 to 60% by weight of the total of rubber is grafted with 60 to 40% by weight of the monomers, the ratio of vinyl aromatic monomer(s) to unsaturated nitrile monomer(s) being in the range of, for example 3:1 to 1:3, typically 3:1 to 1:1. In such cases the graft copolymer is usually used for blending with a glassy non-reinforced thermoplastic such as styrene-acrylonitrile copolymer (SAN).

Preferably an antioxidant or stabiliser, e.g. a bisphenol antioxidant, and, if desired, a modifier such as t-dodecyl mercaptan, is dissolved in the monomer(s) prior to admixture with the latex, the amount of modifier when present generally being from 0.03 to 0.50 parts per hundred parts of (monomer plus rubber). Generally, the amount of modifier affects the flow and impact of the final graft copolymer.

Preferably the rubber latex-monomers-emulsifier admixture is allowed to stand for a period of up to several hours to enable the rubber particles to absorb the monomers before the grafting reaction is initiated. This absorption process is known as imbibition and the period of imbibition is generally called the imbibing time. Imbibition generally enhances the physical properties of the graft copolymer, but in some cases it is possible to omit inbibition altogether whilst still retaining acceptable physical properties in the final graft copolymer. Imbibing times of 0 to 90 minutes at a temperature in the range of 20° to 90°C are generally preferred, more preferably 0 to 50 minutes at a temperature of 50° to 70°C. Imbibition may be carried out batchwise but preferably it takes place under continuous flow conditions. Imbibition may take place in an in-line mixer or an in-line mixer coupled to one or more tubes (preferably vertical) or in a cascade vessel, preferably stirred, the imbibed latex being removed at the outlet which is preferably at the opposite end of the vessel to the inlet. In general, the imbibition period may be reduced if the imbibition temperature is increased and vice-versa. Prior to, or during imbibition emulsification of the monomers in the latex takes place.

The conditions under which the grafting reaction is carried out are typically those known in the art, e.g. using 0.1 to 1% by weight on monomers of a free radical initiator such as potassium persulphate or a hydroperoxide, e.g. diisopropylbenzene hydroperoxide, which may be activated thermally or using, for example, ferrous iron. Grafting is conveniently carried out at a temperature of e.g. 60° to 90°C, the grafting time being adjusted as required to obtain the desired conversion. One preferred method of grafting is a continuous grafting process such as that disclosed in Moore et al copending U.S. application Ser. No. 269,022 filed July 5, 1972 especially when carried out under substantially adiabatic conditions, since any tendency for the reaction to "run away" may be controlled. Generally, conversions of 80% or more, e.g. 90 to 95% are readily obtainable in periods of about 1 to 2 hours at 70° to 90°C. When the grafting reaction is completed, further antioxidant may be added if desired and the graft copolymer isolated by coagulation. After washing and drying, the recovered graft copolymer may be compounded with e.g. lubricants, fillers and/or thermoplastics, as desired. Alternatively the graft copolymer may be recovered in latex form by stripping off unreacted monomer. The recovered graft copolymer may, therefore, be in the form of a latex (by this procedure) or in solid, e.g. pellet or powder, form.

Graft copolymers obtained by the process of the present invention, uncompounded or compounded as desired, may be moulded or shaped into a wide variety of articles as for thermoplastic materials in general.

The following Examples illustrate the invention (wherein all parts are parts dry weight).

EXAMPLE 1

A polybutadiene latex was prepared in emulsion in 5 hrs by a continuous process at a temperature of 85° to 90°C using potassium oleate (0.16 parts per hundred of monomer) and Bevaloid 35 (Bevaloid is a trade mark) — a sodium salt of a naphthalene sulphonic acid-formaldehyde condensate (0.44 p.h.m) as the emulsifiers.

The latex had the following properties.

| | |
|---|---|
| Solids content | 19.3% (by weight) |
| pH | 8.5 |
| Number average particle diameter | 2114A |
| Gel content[1] | 73% |
| Swelling Index[1] | 19 |

Note:[1]Gel content and swelling index were both measured as hereinbefore described.

2.0 parts of a commercially available mixed emulsifier comprising 50% by weight of potassium oleate and 45% potassium linoleate and 5% potassium salts of other fatty acids were taken and admixed with 24 parts (dry) of the latex described above and 0.2 parts of Bevaloid 35 (see above). Approximately 550 parts of water were added so that the solids concentration at the end of the grafting reaction would be approximately 25%.

This latex mixture was warmed and admixed with a monomer masterbatch comprising

| | |
|---|---|
| Styrene | 50 parts |
| Acrylonitrile | 26 parts |
| t-dodecylmercaptan | 0.3 parts |
| Plastanox 425[2] | 0.24 parts |

Note:[2]Plastanox 425 is a hindered phenol antioxidant specifically 22'-methylenebis(4-ethyl-6-tert.-butylphenol). (Plastanox is a trade mark).

The mixture was imbibed at 65°C for 30 minutes after which a ferrous activator to the formula below was added

| | |
|---|---|
| Dextrose | 0.365 parts |
| tetrasodium pyrophosphate | 0.300 parts |
| Ferrous sulphate | 0.006 parts |
| Water | 15.0 parts | together with cumene hydroperoxide (0.6 parts).

The graft polymerisation took place for 1 hour at 65°C, the temperature increasing to 87°C, after which the reaction mixture was aged for 1 hour whilst allowing to cool. During imbibition, grafting and ageing, the reaction mixture was stirred by an anchor stirrer revolving at 280–300 rpm and was maintained under nitrogen. The conversion attained was 90.4% and the per cent coagulum was 0.03.

The graft copolymer latex was coagulated in dilute acid solution and the isolated crumb dried in a vacuum oven for 12 hours at 65°C. Compression moulded test pieces were prepared and tested with the following results:

| A.S.T.M. Test | Property | Result |
|---|---|---|
| D256–56 (1961) | Notches impact strength (⅛" bar) at 23°C | 7.6 ft.lbs. |
| D785 | Rockwell Hardness at 23°C | R97 |
| D1238–657 | Melt Index (at 200°C/5Kg) | 0.5g/10min. |

The example was repeated except that for comparison a low linoleate potassium oleate emulsifier (containing only 2% by weight of potassium linoleate) was used in place of the commercial mixed emulsifier.

The results were as follows (measured under the same conditions).

| | |
|---|---|
| % conversion = | 92 |
| Coagulum | 0.04 |
| Impact Strength | 3.64 |
| Hardness | 94 |
| Melt Flow | 0.14 |

By comparison with the results of the previous experiment it can be seen that a substantial increase in the impact strength and the melt flow properties of the product is obtained by preparing the graft copolymer in accordance with the present invention.

EXAMPLE 2–6

Example 1 was repeated using, in place of the 2.0 parts of commercially available mixed emulsifier, 2.0 parts by weight of an emulsifier prepared by mixing the potassium salt of pure oleic acid and the potassium salt of technical grade linoleic acid in various proportions by weight. Each salt was obtained by careful addition of potassium hydroxide to a suspension of the acid in deionized water at 50°C. The proportion of each salt used and the results obtained (as measured in Ex.1) are given below:

| Example | Potassium | | Impact | Rockwell | Melt |
| | Oleate | Linoleate | Strength | Hardness | Flow |
|---|---|---|---|---|---|
| 2 | 100 | 0 | 4.48 | 93 | 0.28 |
| 3 | 75 | 25 | 6.77 | 93 | 0.32 |
| 4 | 50 | 50 | 7.64 | 91 | 0.50 |
| 5 | 25 | 75 | 7.75 | 91 | 0.38 |
| 6 | 0 | 100 | 5.05 | 91 | 0.60 |

It can be seen that improved properties are obtained by using an emulsifier comprising potassium linoleate especially an oleate/linoleate blend in the ratio 80:20 to 20:80.

What we claim is:

1. A process for preparing a graft copolymer from a latex of a polybutadiene of styrene-butadiene rubbery backbone polymer characterized by the steps of:
   a. admixing the latex, at least one vinyl aromatic monomer selected from the group consisting of styrene, alphamethyl styrene, methyl styrene and vinyl toluene, at least one unsaturated nitrile monomer selected from the group consisting of acrylonitrile and methacrylonitrile, and nor more than 15 parts by weight per hundred parts by weight of rubber of an emulsifier comprising at least 20% of at least one salt of the general formula $$CH_3(CH_2)_x(CH_2CH\!\!=\!\!CH)_n(CH_2)_yCOOM$$

where $x$ is zero or an integer, $y$ is an integer and $n$ is an integer of value 2 to 4, the sum of $x + y + n$ being 10 to 18 and M is an alkali metal;
   b. graft polymerising the latex mixture at a temperature of at least 50° C., and
   c. recovering the graft copolymer.

2. A process according to claim 1 wherein the emulsifier comprises the potassium or sodium salt of an acid selected from linoleic acid and linolenic acid.

3. A process according to claim 1 wherein the emulsifier comprises 20 to 80% by weight of the potassium or sodium salt of an acid selected from linoleic acid and linolenic acid.

4. A process according to claim 2 wherein the emulsifier comprises potassium oleate and 20–80% potassium linoleate.

5. A process according to claim 1 wherein the emulsifier is prepared from the fatty acid fraction of a natural oil without refining of the fraction into its constituent fatty acids.

6. A process according to claim 5 wherein a major proportion of the fatty acid fraction is oleic acid and linoleic acid in the weight ratio of 80:20 to 20:80.

7. A process according to claim 1 wherein the total amount of emulsifier used in the graft polymerisation is 6 to 10 phr.

8. A process according to claim 1 wherein the graft polymerisation is carried out at a temperature of 60° to 90°C.

9. A process according to claim 1 wherein the graft copolymer is recovered in latex form.

10. A process for preparing acrylonitrile-butadiene-styrene from a polybutadiene or styrene-butadiene copolymer latex characterised by the steps of
    a. admixing the latex, styrene, acrylonitrile and not more than 15 parts by weight of rubber (phr) of an emulsifier comprising a major proportion by weight of the potassium or sodium salt of linoleic acid and the potassium or sodium salt of oleic acid in the weight ratio of 80:20 to 20:80;
    b. graft polymerising the latex mixture at a temperature of at least 50°C and
    c. recovering the graft copolymer.

11. A process according to claim 1 including the sodium salt of naphthalene-sulphonic acid-formaldehyde condensate as a secondary emulsifier.

12. A process for preparing a graft copolymer from a latex of a rubbery backbone polymer which is a conjugated diene homopolymer or copolymer of a conjugated diene with a vinyl aromatic monomer characterized by the steps of:
    a. admixing the latex, at least one vinyl aromatic monomer selected from the group consisting of styrene, alpha-methyl styrene, methyl styrene and vinyl toluene, at least one unsaturated nitrile monomer selected from the group consisting of acrylonitrile and methacrylonitrile and not more than 15 parts by weight per hundred parts by weight of rubber of an emulsifier comprising at least 20% of at least one salt of the general formula $$CH_3(CH_2)_x(CH_2CH\!\!=\!\!CH)_n(CH_2)_yCOOM$$

where $x$ is zero or an integer, $y$ is an integer and $n$ is an integer of value 2 to 4, the sum of $x + y + n$ being 10 to 18 and M is an alkali metal;
    b. graft polymerising the latex mixture at a temperature of at least 50° C.; and
    c. recovering the graft copolymer.

13. A process according to claim 12 wherein the backbone polymer is a member of the group consisting of polybutadiene, polyisoprene, a copolymer of butadiene and isoprene, and a copolymer of a member of the group consisting of butadiene and isoprene with a member of the group consisting of styrene and vinyl toluene with 0 to 20% based on the total monomers of a member of the group consisting of acrylic acid, methacrylic acid, acrylonitrile and methacrylonitrile.

* * * * *